No. 781,841. PATENTED FEB. 7, 1905.
T. MULALLY.
CULTIVATOR.
APPLICATION FILED SEPT. 12, 1904.
2 SHEETS—SHEET 1.
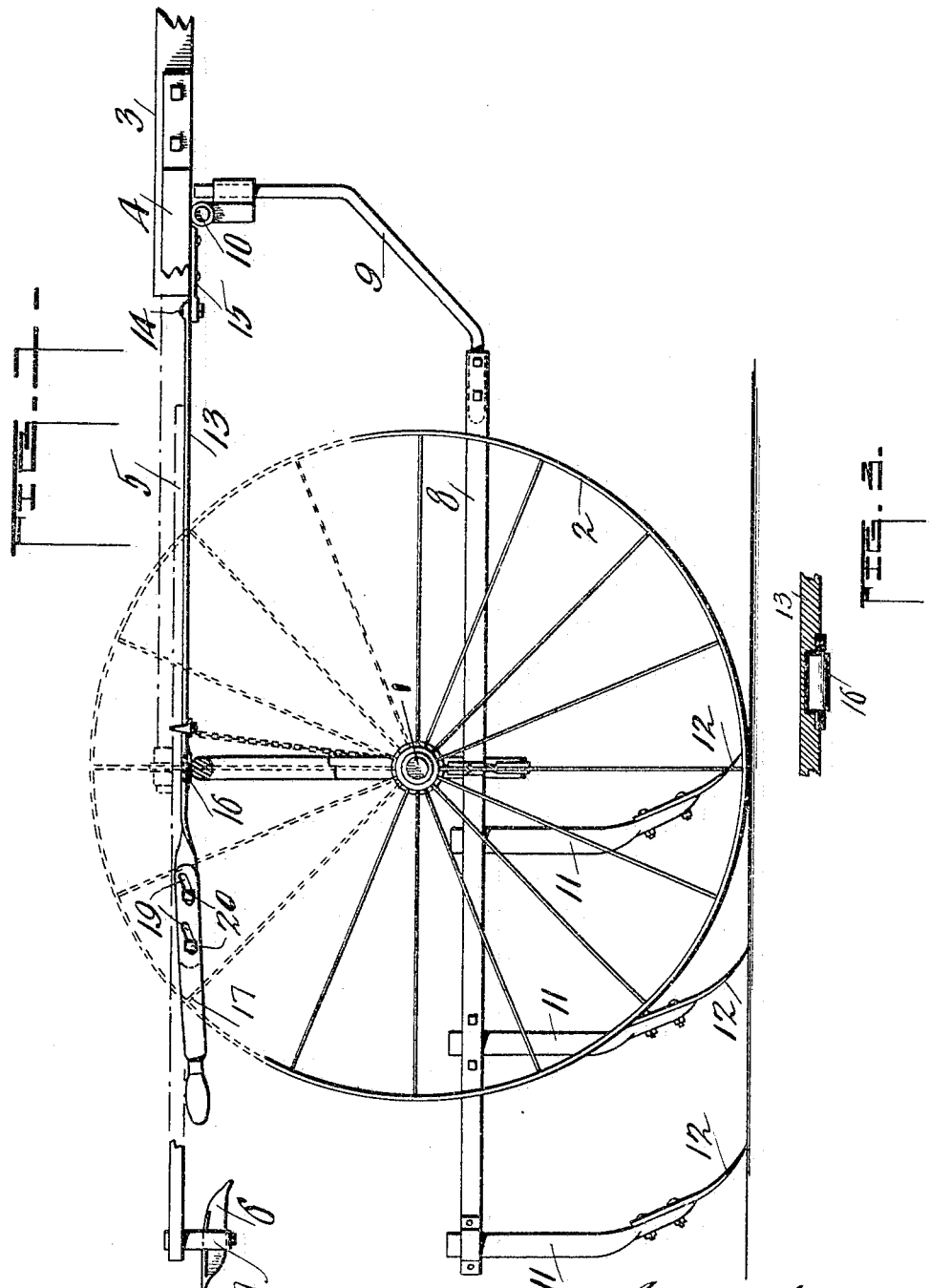

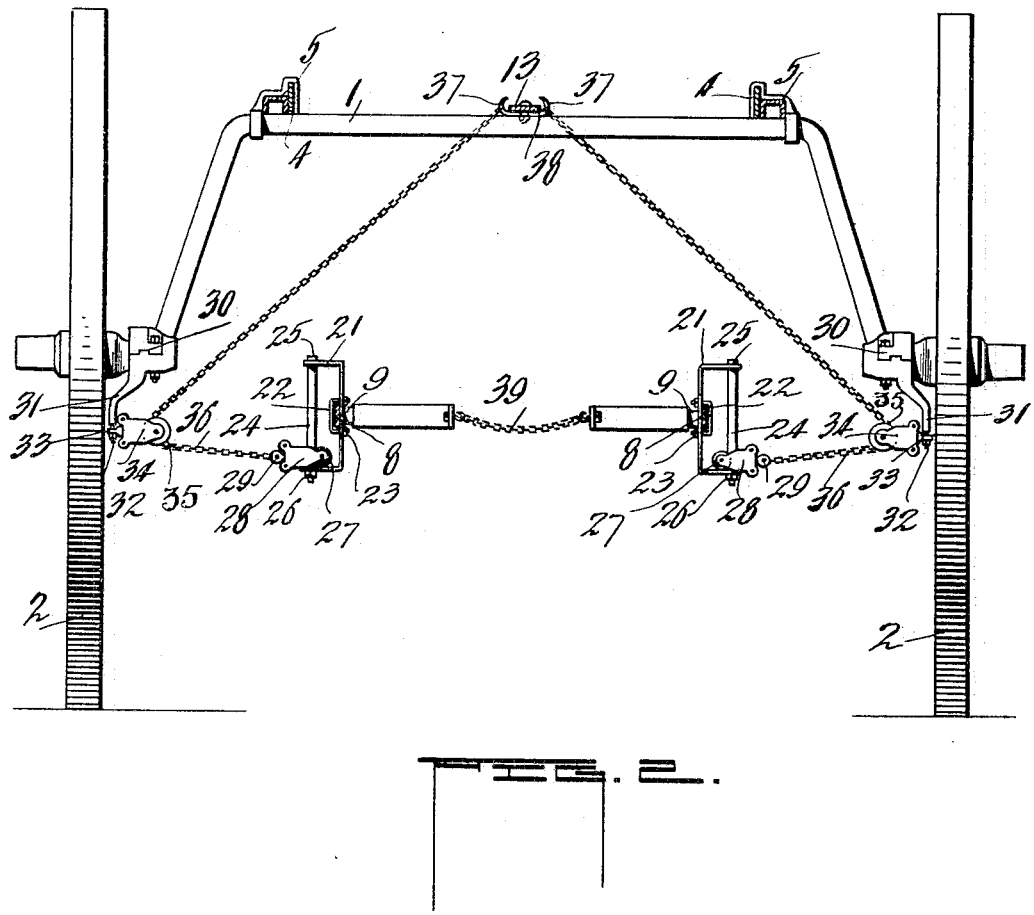

No. 781,841.                                         Patented February 7, 1905.

UNITED STATES PATENT OFFICE.

THOMAS MULALLY, OF PRINCEVILLE, ILLINOIS.

CULTIVATOR.

SPECIFICATION forming part of Letters Patent No. 781,841, dated February 7, 1905.

Application filed September 12, 1904. Serial No. 224,153.

*To all whom it may concern:*

Be it known that I, THOMAS MULALLY, a citizen of the United States, residing at Princeville, in the county of Peoria and State of Illinois, have invented certain new and useful Improvements in Cultivators; and I do hereby declare that the following is a full, clear, and exact description of the invention, which will enable others skilled in the art to which it appertains to make and use the same.

This invention has reference to improvements in cultivators, and particularly to riding-cultivators.

The object of the invention is a guide-lever within reach and controlled by the operator and having connection with the beams or gangs carrying the shovels for guiding and controlling both of the beams with one motion.

A further object of the invention is a guide-lever for cultivators having suitable connection with the shovel-beams, the said lever pivoted at its forward end to the pole of the cultivator and its rear end swingable across the arched axle and having an adjustable handhold. The connections between the lever and the shovel-beams, while controlling their lateral motion, do not interfere with the device for raising and lowering the said shovels.

The invention has for its further object details of construction to be hereinafter more fully described in the specification, pointed out in the appended claims, and illustrated in the accompanying drawings, forming a part of this application, in which—

Figure 1 is a side elevation, with parts broken away and in section, of so much of a well-known form of cultivator as to illustrate my improvements attached thereto. Fig. 2 is a rear elevation, parts in section, of the cultivator shown in Fig. 1 and illustrates a rear elevation of the guiding-lever and the connections between the shovel-beams and the said lever. Fig. 3 is a sectional detail showing the roller in the body of the lever.

In the drawings, 1 denotes the customary arched axle in use in well-known forms of cultivators, on the opposite end of which are carried the ground-wheels 2.

3 denotes a pole, to which are attached suitable swingle and double trees, and 4 denotes straps which are secured at their forward ends to the pole and at their inner ends fixedly attached to the arch of the axle 1, and 5 denotes additional frame parts which extend across the arch of the axle and at their forward ends are secured to the straps 4, and their rear ends support a driver's seat 6, attached to a spring-strap 7, the ends of which are secured to the rear end of the frame parts 5.

8 denotes shovel-beams which at their forward ends are attached to rods 9, which have a swingable connection with a transverse rod 10, suitably supported under the pole. The beams 8 are of the usual construction and support the shanks 11 at their lower ends, carrying customary shovels 12.

In the drawings I have shown the necessary frame parts and outline of a well-known form of cultivator, that the application of my improvements to a cultivator may be more readily understood. However, it is understood that no special claim is made upon any of the parts of a cultivator. Therefore it has not been thought necessary to show the means of raising and lowering the beams, the stirrups attached thereto, nor other well-known features which form a part of most every riding-cultivator.

13 refers to a longitudinally-disposed lever pivoted at its forward end at 14 to a strap or bar 15, secured to the pole 3. The lever extends rearwardly and across the arch of the axle 1, having a roller 16 suitably journaled or carried in the body of the lever adapted to roll upon the upper face of the arch of the axle 1 and facilitates when swinging the lever 13 to relieve any friction or binding upon the arch of the axle. The rear end of the lever 13 is directed slightly downwardly and has adjustably connected therewith a lever extension 17, to which is secured a handhold disposed within easy reach of the driver when seated in the seat 6 of the cultivator. The adjustment between the extension 17 in the main body 13 of the lever is secured by slots 19 and bolts 20, all of which will be understood. The object of providing an adjustable connection in the length of the lever is to give more leverage to a younger person, such as a boy, when using the cultivator and for use when cultivating the ground between crooked rows of corn.

At a suitable point on the beams 8 is secured a suitable strap and attached to the beams by means of the U-shaped rods 22, which surround the beams 8 in manner seen in Fig. 2 and retained in place by the nuts 23. The said straps support the elongated sleeves 24, which are secured in position on the straps by means of the rods 25 and the nuts 26. Slidable up and down and having engagement with the sleeves 24 are sheave-wheels 27, which are carried by castings 28, and having a swivel connection with said castings are eyebolts 29. The uses of the castings together with the eyebolts and sheave-wheels will be further described.

Carried on the axle 1 on the side of the hub of the ground-wheels 2 is shown the dust-proof and oil-retaining caps 30, being formed of two sections. The lower sections are provided with the depending threaded studs 31, on which are retained by nuts 32 eyebolts 33, which have a swivel connection with castings 34, which carry suitable sheave-wheels 35.

36 denotes chains which at one end are secured to the eyebolts 29 of the castings 28 and passing up and around the sheave-wheels 35 of the castings 34 are attached to the opposite hooks 37 of a plate 38, secured at a suitable point to the main body of the lever 13.

From the drawings it will be seen that castings 34, through their eyebolts 33, have a swinging connection with the studs 31, also that the castings 28, through their sheave-wheels 27, have a vertical sliding movement on the sleeves 24, the latter adapted to raise and lower with the movement of the shovel-beams when they are depressed into the ground or raised therefrom.

The shovel-beams are suitably connected by means of a chain 39 for holding the relative position of the opposite beams and coact with the chains 36 and the lever 13 for guiding and shifting the said beams.

The use of the guiding-lever and its connection with the shovel-beams produces a result in a riding-cultivator not heretofore attained. It does away with all footwork on the part of the driver for guiding the shovel-beams and is yet so convenient that the driver can handle the lines in one hand and operate the lever with the other and may assist himself in the use of the stirrups, if necessary, and it will thus be seen that through the connections described and the arrangement both of the beams are controlled with one motion of the lever. It has the advantage of holding the shovels steadily to their work and obviates the necessity of keeping the springs tight.

This improvement has its advantage on a cultivator when cutting weeds, for by use of the chains 36 and 39 the beams are held to their work.

A further advantage of the improvement herein is in the use of a cultivator on the side of a hill. It is a well-known fact that the cultivator will naturally run downhill, and it is practically impossible to hold the beams to their work by the use of the feet, as one side must be depressed and the other lifted. This has been entirely overcome by the use of the lever herein shown and the connection with the shovel-beams, as the said shovels may be retained in any adjusted position, whether upon level or hilly ground.

It is obvious from the foregoing that changes may be made and the application of the device modified to adapt it to various styles and forms of cultivators, and I do not wish to be confined to the exact details herein.

Having thus fully described my invention, what I claim, and desire to secure by Letters Patent of the United States, is—

1. In a cultivator, the combination with the shovel-beams, of a lever pivoted at its front end to the pole and the body thereof crossing the axle, chains connected with the beams and the lever, and sheave-wheels suitably supported by the axle around which the chains are carried, substantially as specified.

2. In a cultivator, the combination therewith, of a lever pivoted at its front end to the pole and the body thereof horizontally swingable across the axis, chains connected with the body of the lever and with devices slidably connected with the shovel-beams and sheave-wheels suitably supported by the axle around which the chains are carried, substantially as specified.

3. In a cultivator, the combination with the shovel-beams, a lever fulcrumed in advance of the axle and the body thereof horizontally swingable across the same, chains connected at one end to the lever and having connection at their opposite ends with means having a vertically-slidable connection with the beams, and guides supported by the bearings of the axle around which the chains are carried, substantially as specified.

4. In a cultivator, the combination with the shovel-beams, straps attached to said beams upon the outer sides of said beams, members vertically slidable on the straps, a lever horizontally swingable across the arched axle, chains connected to the lever in advance of the axle and their opposite ends attached to the members aforesaid, and guiding sheave-wheels around which the chains are carried, substantially as specified.

5. In a cultivator, the combination with the shovel-beams, and the supports therefor, of a guide-lever pivoted at its forward end and having a handhold adjustably connected with the main body portion thereof, chains connected at one end to the body of the lever and their opposite ends connected to devices which have a slidable connection with the shovel-beams and guides for the said chains disposed between their ends, substantially as specified.

6. In a cultivator, the combination with shovel-beams and supports therefor, a lever pivoted to have lateral swinging motion, members fixedly attached to the beams, castings supported by said members and vertically slidable, chains connected with the lever and with the castings aforesaid, and sheave-wheels suitably supported around which the chains are carried and serving as guides therefor, substantially as specified.

7. In a cultivator, the combination with shovel-beams and supports therefor, a chain for connecting the beams to each other, a lever pivoted to have lateral swinging motion, devices slidably connected with the shovel-beams, chains attached to the lever and with the devices on the shovel-beam, and sheave-wheels around which the said chains are carried, the sheave-wheels supported by the axle of the cultivator adjacent to its wheels, substantially as specified.

8. In a cultivator, the combination with shovel-beams, and supports therefor, of a lever disposed longitudinally and pivoted at its forward end, the body of the lever crossing the arch axle and provided with a roller adapted to contact with the arch of the axle, straps attached to the said beams and provided with vertically-disposed stems, castings supporting sheave-wheels which are movable upon the stems of the aforesaid straps, chains attached to the lever and connected with the castings aforesaid, and guiding sheave-wheels for the said chains to facilitate in guiding the shovel-beams when the lever is actuated, substantially as described.

In testimony whereof I affix my signature in presence of two witnesses.

THOMAS MULALLY.

Witnesses:
   CHAS. N. LA PORTE,
   ROBERT N. MCCORMICK.